United States Patent [19]

Hadjiiliev et al.

[11] 4,032,356

[45] June 28, 1977

[54] COMPOSITION FOR PREVENTING ADHESION OF DAMP EARTH ON METAL SURFACES

[75] Inventors: Ruscho Panayotov Hadjiiliev; Maria Ivanova Todorova, both of Stara Zagora; Tzvetan Obretenov Georgiev, Sofia; Kubrat Vassilev Naydenov, Stara Zagora; Dinko Mihaylov Jechev, Village Konyovo, beside Sliven; Yanka Bogdanova Staneva; Irina Valcheva Hadjiilieva, both of Stara Zagora, all of Bulgaria

[73] Assignee: Mnipki "Minprojekt", Sofia, Bulgaria

[22] Filed: Nov. 24, 1975

[21] Appl. No.: 634,538

[52] U.S. Cl. .................................... 106/287 R
[51] Int. Cl.² ................ C07G 17/00; C09K 3/00
[58] Field of Search ............. 106/287 R; 260/239.3

[56] References Cited

UNITED STATES PATENTS 3,910,891  10/1975  Baker ........................... 260/239.3

*Primary Examiner*—Theodore Morris

[57] ABSTRACT

A composition for preventing the adhesion of damp earth on the metal surfaces of mechanical ore transport equipment, such as carriages, is described. The composition contains 30–85% by weight of an oleous liquid representing a by-product of the generation of cyclohexanon during the production of caprolactam. The remainder of the composition are waste products obtained from oil refining, specifically a heavy xylene fraction generated as a by-product of the hydration of pyrolized gasoline, or a highly aromatic viscous oil.

3 Claims, No Drawings

COMPOSITION FOR PREVENTING ADHESION OF DAMP EARTH ON METAL SURFACES

BACKGROUND OF THE INVENTION

The invention relates to materials for inhibiting the adhesion of damp, ore-containing earth to metal surfaces of ore transport carriers in mining applications.

One of the principal causes of delays and down-time in the mining of natural ores is the necessity of removing, from the working metal surfaces of ore transport carriers, an adherent accumulation of damp earth.

In order to remove the damp earth, it is ordinarily necessary to shunt the carriage onto a separate servicing track, during which time such rolling stock remains idle and unproductive.

In an attempt to suitably condition the surfaces of the transport carriages to facilitate the removal of the earth, certain anti-adhesive compositions have been evolved. Principal among these have been solutions of alkaline metals as well as various waste products, such as those resulting from the oxysynthesis of alcohols and the refining of petroleum. To date, none of such materials have proved satisfactory for the intended anti-adhesion purposes, and in the case of the solutions of alkaline metals have been found to have a corrosive effect on the metal surfaces of the carriage.

DESCRIPTION OF THE INVENTION

The composition of the instant invention has been found to be far more effective in preventing adhesion of moist earth from the carriage metal surfaces than the prior art compositions, and in addition are non-corrosive, safe and easy to apply, and are sanitary and fireproof.

Illustratively, the improved composition contains from 30–85% by weight of a resinous-type residue, in the form of an oleous liquid, obtained as a by-product of the generation of cyclohexanon in the production of caprolactam using the phenolic method. The remainder of the composition is an oil refining waste product, which may either be a heavy xylene fraction of the type produced during the hydration of pyrolized gasolene, or a condensed, highly aromatic viscous oil.

The oleous liquid forming the principal portion of the composition may be a mixture of residues resulting from the rectification process employed for the obtaining of cyclohexanon in the process indicated above. Preferably, the oleous liquid has a heavy fraction content of not less than 86.5%. Such heavy fraction has marked hydrophobic properties, and when applied as a coating on the metallic walls of the ore transport carriage serves to decrease the hydrophility of such surface to the clays present in the ore-containing earth. The oleous liquid further has a content of phenol of not more than 5.5%, a content of cyclohexanol of not more than 7%, and a content of light volatile fractions of not more than 0.004%.

Additionally, the liquid, which has a dark brown color, has a boiling point in the range of 140°–160° C, a freezing point of 20° C, and a specific weight of 0.95–1.00. The substance is soluble in water but miscible with many organic solvents.

The heavy xylene fraction contemplated by the invention for use in the anti-adhesive composition is a complex mixture of aromatic and olefin hydrocarbons. Their boiding point is 150° C and their freezing point is −20° C. The water solubility of such fractions, which are dark brown and highly motile liquids, is negligible, but are miscible with many organic solvents.

The characteristics of the aromatic oils which can be substituted for the heavy xylene fractions in the anti-adhesive composition are of a dark brown-greenish color and exhibit a viscosity of not less than 12 at 100° C. They have a water content equal to or less than 1%, a maximum phenolic content of 0.05%, and a maximum chemical impurities content of 0.01%. They are storable in tanks at a temperature of 60–95° C, and, like the above-mentioned ingredients, are substantially insoluble in water but are miscible with many organic solvents.

Without limiting the generality of the foregoing, the following examples set forth illustrative compositions in accordance with the invention:

EXAMPLE 1

A composition was formed containing 83.4% of a mixture of resinous, oleous liquids formed during the generation of cyclohexanon as indicated above, and 16.6% of viscous aromatic oils obtained from the selective refining of petroleum. The composition was sprayed on the metal surfaces of six ore transport carriages whose internal volume was 40 cubic meters. Nine liters of the composition were sprayed on the metal surfaces of each of the 6 carriages for 6 days. During such period, in which the ambient temperature was within the range of 10.7° – 18.1° C, ore-containing earth having an average dampness of 34.5% was loaded on and removed from the sprayed carriages in the normal manner, and the metal surfaces were cleaned after each unloading operation.

During the same period, 6 reference or standard carriages of the same type were not sprayed, but were merely cleaned after each unloading operation of the damp earth. The total volume of damp earth which had adhered to the surfaces of both sets of carriages was measured.

It was found that at the end of the test period, the quantity of damp earth that had adhered to the sprayed carriages was 2–3 cubic meters per carriage, while the quantity of damp earth adhering to the surfaces of the unsprayed carriages was 4–8 cubic meters per carriage. In addition, it was found that the sprayed surfaces exhibited no signs of corrosion.

EXAMPLE 2

In this case, the oleous liquid component of the composition was 75%, with the remainder 25% of heavy xylene fractions obtained as indicated above. The same testing program was carried out with such composition as in Example 1 above, with substantially identical results.

EXAMPLE 3

The composition was formulated using 85% of the oleous liquid and 15% of viscous aromatic oil produced as indicated above. Again, the test program as in Example 1 was run with similar results.

EXAMPLE 4

In this case, the amount of the oleous liquid present in the composition was reduced to 30.85%, with the remaining 69.15% constituting a mixture of heavy xylene fractions and viscous aromatic oils produced as indicated above. When the test program set forth in Example 1 was carried out, the test results and advantages were substantially the same as that obtained in Examples 1-3.

In the foregoing, several illustrative formulations of the anti-adhesive composition of the invention have been set forth. Many variations and modifications will now occur to those skilled in the art. It is accordingly desired that the scope of the appended claims not be limited to the specific disclosure herein contained.

What is claimed is:

1. A new composition of matter for preventing the adhesion of ore-containing earth on metal surfaces of ore transport carriages for mining applications, consisting of 80-85% by weight of at least one resinous oleous liquid having a boiling point in the range of 140°-160° C, a freezing point of about −20° C, and a specific weight of 0.95-1.00, the liquid being formed as a by-product of the generation of cyclohexanon from phenol during the manufacture of caprolactam, and the remainder by weight of a substance selected from the group consisting of at least one heavy xylene fraction and at least one condensed, highly aromatic oil produced as a by-product of oil refining.

2. A composition as defined in claim 1, in which the oleous liquid has a heavy fraction content of not less than 86.5%.

3. A composition as defined in claim 1, in which the heavy xylene fractions are by-products of the hydration of pyrolized gasoline.

* * * * *